(12) United States Patent
Dietl et al.

(10) Patent No.: US 10,960,581 B2
(45) Date of Patent: Mar. 30, 2021

(54) METHOD FOR SELECTIVELY PRODUCING A FIRST OR A SECOND VARIANT OF A MULTI-LAYER PLASTIC COMPONENT

(71) Applicant: Bayerische Motoren Werke Aktiengesellschaft, Munich (DE)

(72) Inventors: Florian Dietl, Schwarzach (DE); Ralph Kurz, Mamming (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 302 days.

(21) Appl. No.: 15/995,911

(22) Filed: Jun. 1, 2018

(65) Prior Publication Data

US 2018/0272570 A1 Sep. 27, 2018

Related U.S. Application Data

(63) Continuation of application No. PCT/EP2016/077028, filed on Nov. 9, 2016.

(30) Foreign Application Priority Data

Dec. 2, 2015 (DE) .................. 10 2015 223 961

(51) Int. Cl.
*B29C 37/00* (2006.01)
*B29C 44/04* (2006.01)
(Continued)

(52) U.S. Cl.
CPC ...... *B29C 37/0025* (2013.01); *B29C 44/0461* (2013.01); *B29C 44/1233* (2013.01);
(Continued)

(58) Field of Classification Search
CPC ............ B29C 44/1238; B29C 44/0461; B29C 44/1252; B29C 44/569; B29C 37/0025
See application file for complete search history.

(56) References Cited

U.S. PATENT DOCUMENTS 4,379,856 A * 4/1983 Samaritter .......... B29C 44/0461
264/45.1
4,663,210 A 5/1987 Schreiber et al.
(Continued)

FOREIGN PATENT DOCUMENTS

CN 103313880 A 9/2013
DE 33 36 934 A1 5/1985
(Continued)

OTHER PUBLICATIONS

Chinese Office Action issued in Chinese counterpart application No. 201680049544.4 dated May 17, 2019 (Eight (8) pages).
(Continued)

*Primary Examiner* — Jacob T Minskey
*Assistant Examiner* — Virak Nguon
(74) *Attorney, Agent, or Firm* — Crowell & Moring LLP

(57) ABSTRACT

A method for selectively producing a first or a second variant of a multi-layer plastic component, where both variants have a substrate part, a decorative layer, and a foam layer between the substrate part and the decorative layer, includes producing the foam layer in a foaming mold which has a first mold half, into which the substrate part is inserted before the foaming process. To produce the first variant, the decorative layer is inserted into a second mold half of the foaming mold before the foaming process. To produce the second variant, a spacer layer is inserted into the second mold half before the foaming process where, after the foaming process, the spacer layer is removed from the foam layer and the decorative layer is applied to the foam layer. The foam layer includes at least one first portion having a higher contour stability than a second portion.

13 Claims, 1 Drawing Sheet

(51) Int. Cl.
*B29C 44/12* (2006.01)
*B29C 44/56* (2006.01)
*B29L 31/30* (2006.01)
*B29K 75/00* (2006.01)

(52) U.S. Cl.
CPC ...... *B29C 44/1252* (2013.01); *B29C 44/1257* (2013.01); *B29C 44/5681* (2013.01); *B29K 2075/00* (2013.01); *B29K 2995/007* (2013.01); *B29L 2031/3008* (2013.01)

(56) References Cited

U.S. PATENT DOCUMENTS

| | | | |
|---|---|---|---|
| 5,252,270 | A | 10/1993 | Haardt et al. |
| 2003/0041955 | A1 | 3/2003 | Spengler |
| 2008/0277955 | A1* | 11/2008 | Sato ...................... B29C 44/146 296/1.08 |
| 2013/0153122 | A1* | 6/2013 | Filipp ................... B60N 2/609 156/93 |
| 2015/0321397 | A1 | 11/2015 | Marchetti et al. |

FOREIGN PATENT DOCUMENTS

| | | | | |
|---|---|---|---|---|
| DE | 10 2009 050 620 | A1 | 4/2011 | |
| DE | 102009050620 | A1 * | 4/2011 | ......... B29C 44/1238 |
| DE | 10 2011 005 343 | A1 | 9/2012 | |
| DE | 102011005343 | A1 * | 9/2012 | ......... B29C 44/0476 |
| JP | 2001-9956 | A | 1/2001 | |
| JP | 2001009956 | A * | 1/2001 | |
| WO | WO 86/06439 | A1 | 9/1986 | |

OTHER PUBLICATIONS

PCT/EP2016/077028, International Search Report dated Mar. 16, 2017 (Three (3) pages).

German Search Report issued in German counterpart application No. 10 2015 223 961.6 dated Mar. 11, 2016, with Statement of Relevancy (Seven (7) pages).

* cited by examiner

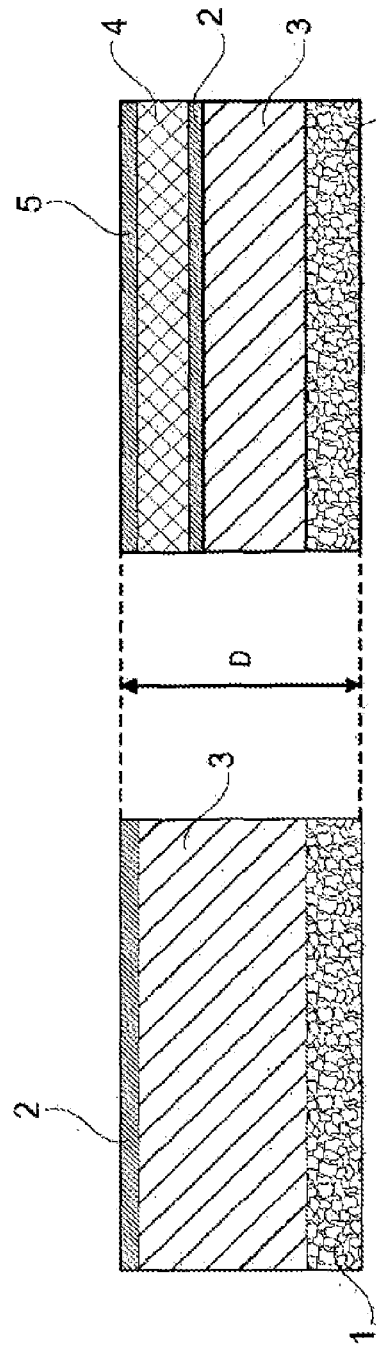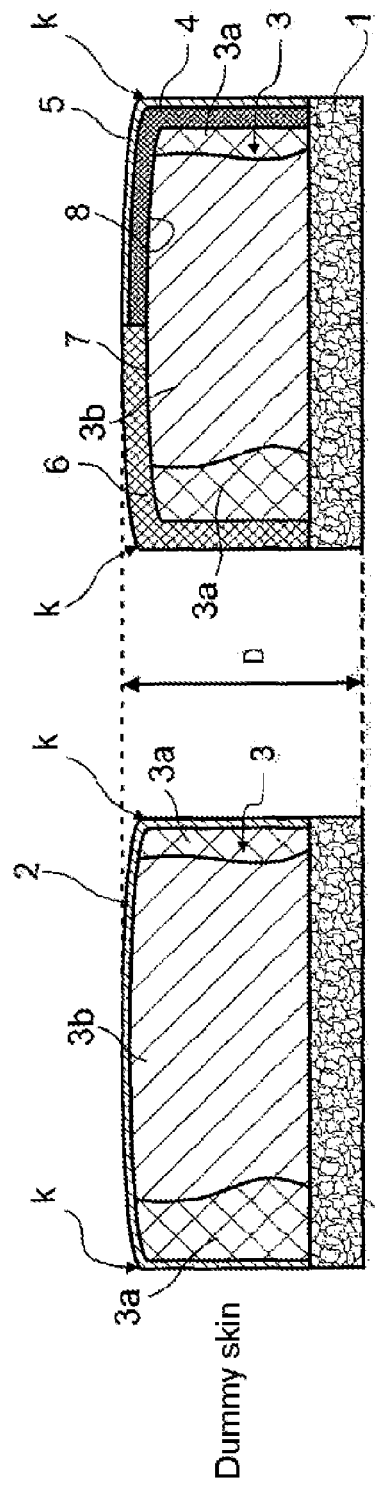

...

METHOD FOR SELECTIVELY PRODUCING A FIRST OR A SECOND VARIANT OF A MULTI-LAYER PLASTIC COMPONENT

CROSS REFERENCE TO RELATED APPLICATIONS

This application is a continuation of PCT International Application No. PCT/EP2016/077028, filed Nov. 9, 2016, which claims priority under 35 U.S.C. § 119 from German Patent Application No. 10 2015 223 961.6, filed Dec. 2, 2015, the entire disclosures of which are herein expressly incorporated by reference.

BACKGROUND AND SUMMARY OF THE INVENTION

The present invention concerns a method for selectively producing a first or a second variant of a multi-layer plastic component.

Some vehicle types of the BMW brand are offered with different dashboard variants, more specifically with a basic variant and a special edition variant. Common to both variants is their multi-layer construction consisting of a substrate part, a decorative layer, and a foam layer positioned therebetween. FIG. 1a shows a basic variant and FIG. 1b a special edition variant, which has the same overall thickness D as the basic variant. As can be seen from FIGS. 1a and 1b, the substrate part 1 of the basic variant is identical to the substrate part 1 of the special edition variant. In the basic variant of FIG. 1a a relatively thin decorative layer 2 made of plastic is provided, the upper side of which can be provided with a leather-like grain, for example. The space between the substrate part 1 and the thin "plastic skin 2" is formed by a (semi-)rigid foam layer 3.

The special edition variant of FIG. 1b has a somewhat thinner foam layer 3, onto which is likewise applied a plastic skin 2, which is no longer visible from the outside on the finished component and for the manufacture of which a separate mold is required; this is associated with correspondingly high expense. A two-layer decorative layer formed from a shear-elastic layer 4 and a leather layer 5 is applied to the plastic skin 2. The shear-elastic layer 4 can be formed by a "knitted spacer fabric".

In the production of the two variants shown in FIGS. 1a and 1b, the substrate part 1 is introduced into an upper mold half and the molded skin 2 into a lower mold half of a mold. The space therebetween is then filled with foam. Since the foam layer 3 of the special edition variant shown in FIG. 1b is smaller than that of the basic variant shown in FIG. 1a, a separate mold is needed for each of the two variants, and this is associated with high costs. Although the molded skin used in the special edition variant of FIG. 1b is no longer visible from the outside on the finished product, based on current knowledge it is necessary, because the knitted spacer fabric 4 cannot be placed directly in the foaming mold, since otherwise the plastic foam would penetrate the knitted spacer fabric 4, causing it to harden.

A method for selectively producing a first or a second variant of a multi-layer plastic component is known from laid-open application DE 10 2009 050 620 A1.

In the prior art methods for producing interior components or trim components, a foam surface is provided with a surface layer. This surface layer can be designed as a decorative film or as a synthetic or real leather layer. Since the foam is very yielding, no clearly defined contours can be created on the surface of the component.

The problem addressed by the invention is that of providing a method for selectively producing a first or a second variant of a multi-layer plastic component which offers cost advantages over known methods. A specific problem addressed by the invention is that of providing a method with which different versions of plastic components can be easily produced.

The starting point for the invention is a method for selectively producing a first or a second variant of a multi-layer plastic component, such as a dashboard covering for the passenger compartment of a vehicle. Both variants have a substrate part, a "decorative layer", and a foam layer positioned between the substrate part and the decorative layer. The term "decorative layer" is to be understood to mean that it can be a single layer or a decorative layer constructed from a plurality of sublayers. In a first embodiment of the method a first variant, for example a basic variant (standard equipment), can be produced. In accordance with a second embodiment of the method another variant, for example a special edition variant, can be produced.

For design reasons, however, both variants should have exactly or at least almost the same surface contour (same radii of curvature, etc.).

Both variants can even have the same overall thickness, the thickness of the decorative layer of the first variant being less than the thickness of the decorative layer of the second variant and the thickness of the foam layer of the first variant being correspondingly greater than the thickness of the foam layer of the second variant.

The foam layer is produced in a foaming mold having a first mold half, into which, before the start of the foaming process, the substrate part is introduced. The substrate part can be introduced for example into an upper mold half of the foaming mold and held in place on the upper mold half by negative pressure, i.e., by "upward suction".

The core of the invention lies in the fact that the foam layer has a plurality of regions with differing contour strengths or contour stabilities. In predetermined regions of the trim part, in which distinct contours are desired on the surface, foam layer regions having high contour stability are produced. In this way, a soft feel can be retained in the other regions, in which a yielding surface is desired. A trim part according to the invention is thus distinguished by well-defined character lines combined with a yielding feel.

To achieve these contour stability properties, foam materials with differing degrees of hardness can be used in the different regions. This can be achieved on the one hand through the use of different materials. On the other hand, polyurethane (PUR) can also be used in both regions. In the latter case the material properties of the polyurethane are obtained by adjusting the individual constituents thereof accordingly.

Firstly, a first component is applied to the decorative layer or to the substrate layer. This component is sprayed onto regions that in the finished component are to correspond to the contour-stable regions. Next, a second component is sprayed onto regions that in the finished trim component are to constitute regions having a yielding feel. Then the mold is closed, and the foam layer is formed in a foaming process.

According to the first embodiment, to produce the first variant the decorative layer of the first variant is introduced into a second, for example lower, mold half of the foaming mold prior to the foaming process. According to the second embodiment, to produce the second variant of the plastic component a "spacer layer" is introduced into the second mold half of the foaming mold prior to the foaming process, wherein the spacer layer is removed from the foam layer after the foaming process and the decorative layer of the second variant is applied to the foam layer.

In this way, two or more different variants of a multi-layer plastic component, in which the thicknesses of individual layers may vary but the overall thickness may be identical or almost the same, can be manufactured using the same foaming mold. Alternatively, each variant can be manufactured in a separate, dedicated foaming mold.

The spacer layer, which is also known as a dummy skin, is treated with release agent on the rear side thereof. The rear side in this case corresponds to a side of the spacer layer with which it comes into direct contact with a mold half. Introducing the spacer layer into the mold creates a surface that is offset with respect to the surface of the mold. During production of a foam structure the spacer layer acts as a substitute for surface layers that are applied to the foam structure only after completion thereof. Such surface layers can be formed from leather, synthetic leather or similar materials, for example. In this way, once the surface layer is applied, the resulting dimension is no greater than that of a variant in which the surface layer is formed from a film and is thus substantially thinner.

The spacer layer is preferably reused, i.e., it is used to produce a multiplicity of second variants of the plastic component. It should be made of a material having a certain elasticity, such that the spacer layer can be peeled away from the foam layer without damaging the foam layer. Experiments have shown that a spacer layer made of silicone or of a silicone-containing material is very suitable for this purpose, preventing the foam layer from "sticking" to the spacer layer. A spacer layer made of silicone or of a silicone-containing material can be peeled away from the foam layer to leave absolutely no residue. However, the spacer layer can also be formed from other materials without departing from the scope of the invention.

The foam layer can be a polyurethane foam layer.

Furthermore, the substrate part can be formed substantially from expanded polypropylene.

Other objects, advantages and novel features of the present invention will become apparent from the following detailed description of one or more preferred embodiments when considered in conjunction with the accompanying drawings.

The invention is described in more detail below in conjunction with the drawings. The Figures show schematic views by way of example.

BRIEF DESCRIPTION OF THE DRAWINGS

FIG. 1a shows a first variant of a multi-layer plastic component in accordance with the prior art.

FIG. 1b shows a second variant of a multi-layer plastic component in accordance with the prior art.

FIGS. 2a, 2b show two variants of a multi-layer plastic component in accordance with the invention.

DETAILED DESCRIPTION OF THE DRAWINGS

FIGS. 2a and 2b show two different variants of a multi-layer plastic component in accordance with the invention.

A first embodiment of the invention is explained with reference to FIG. 2a. Analogously to FIG. 1a, FIG. 2a shows a basic variant that includes a substrate part 1, a decorative layer 2 formed by a molded skin, and a semi-rigid foam layer 3 therebetween, connecting the substrate part 1 and the decorative layer 2, which can consist of polyurethane, for example. In the marginal regions thereof, this foam layer 3 has dimensionally stable regions 3a. A central region 3b is softer or more yielding than the dimensionally stable marginal regions 3a. The multi-layer plastic component of FIG. 2a has an overall thickness D. The dimensionally stable regions 3a enable contours k to be created on the visible surface of the decorative layer 2, which stand out particularly clearly.

A second embodiment of the invention is explained with reference to FIG. 2b. FIG. 2b shows a special edition variant in which the same substrate part 1 is used as in the basic variant. Alternatively, however, any other substrate part 1 can also be used. In production, the substrate part 1 is first introduced into a top mold of a foaming mold and held in place by negative pressure, for example. In the bottom mold of the foaming mold (not shown) is placed a spacer layer 6 made from a silicone material. Analogously to the embodiment described with reference to FIG. 2a, a foam layer 3 is created in this case too, including more dimensionally stable regions 3a and softer region 3b. In this second embodiment too, the harder regions 3a are provided at the edge of the component and the more yielding region 3b in the central region of the component. To produce these regions, a first component or a first material is first sprayed onto the substrate part 1 or the spacer layer 6 in the regions in which first regions 3a are to be formed on the finished component. Then a second component or a second material is sprayed onto the substrate part 1 or the spacer layer 6 in the regions in which second regions 3b are to be formed on the finished component. After closing the foaming mold, the space between the substrate part 1 and the spacer layer 6 is filled with foam, producing the foam layer 3 having the first regions 3a and the second regions 3b. As can be seen from FIGS. 2a and 2b, the foam layer 3 of the variant shown in FIG. 2b is somewhat thinner than the foam layer 3 of the basic variant shown in FIG. 2a.

After foaming the foam layer 3, the foaming mold is opened and the back-foamed substrate part 1 is removed. Following removal, the elastic spacer layer 6 is peeled away. As the spacer layer 6 consists of a silicone material, the foam layer 3 does not stick or sticks only slightly to the spacer layer 6. Accordingly, the spacer layer 6 can be peeled away without leaving a residue and without thereby damaging the surface 7 of the foam layer 3.

In the embodiment shown here, the spacer layer 6 is the same thickness as the decorative layer formed by the knitted spacer fabric 4 and the leather layer 5. After peeling away the "silicone layer 6", the decorative layer formed by the two layers 4 and 5 is adhesively bonded by the underside 8 of the knitted spacer fabric 4 to the upper side 7 of the foam layer 3, resulting in the finished dashboard trim in its special edition variant with a leather covering. Analogously to the basic variant, the embodiment shown in FIG. 2b also has characteristic contours k. In this region the decorative layer is supported by the dimensionally stable region 3a, so clearly defined contour lines on the surface of the decorative layer stand out.

As can be seen from FIGS. 2a and 2b, in the embodiment shown here both the basic variant and the special edition variant have the same overall thickness D. The two variants do not necessarily have to have this same overall thickness D, however.

As an alternative to a "two-ply" decorative layer formed from the two layers 4 and 5, a "single-ply decorative layer" differing from the decorative layer of the first variant could also be used for the second variant. One possibility, for example, is a synthetic or natural leather layer, the thickness of which is in the range between 1.0 mm and 2 mm, for example, or a plastic skin having a different composition and/or a different thickness from the decorative layer of the first variant.

The invention offers the advantage that contours created in a CAD system can be reproduced with a high degree of accuracy on the actual component. This is made possible by the use of dimensionally stable or rigid foam materials in the regions of the trim part in which contours are to be presented. In these regions the foam layer does not yield when the decorative layer is applied. A further advantage of the invention is that a high degree of consistency in gaps between adjacent add-on parts can be achieved, resulting in good joint patterns. By using differing foam materials in the different regions 3a, 3b of the foam layer 3, different surface requirements can be met such as contour stability, contour accuracy, hardness, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for selectively producing a first or a second variant of a multi-layer plastic component, wherein:
    both the first and second variants have a substrate part, a decorative layer, and a foam layer disposed between the substrate part and the decorative layer;
    and comprising the acts of:
    producing the foam layer in a foaming mold having a first mold half and introducing the substrate part into the first mold half before a start of a foaming process; wherein:
    to produce the first variant the decorative layer is introduced into a second mold half of the foaming mold prior to the foaming process; and
    to produce the second variant a spacer layer is introduced into the second mold half of the foaming mold prior to the foaming process, wherein the spacer layer is removed from the foam layer after the foaming process and the decorative layer of the second variant is applied to the foam layer;
    wherein the foam layer includes a first portion that has a higher contour stability than a second portion of the foam layer;
    wherein the first portion that has the higher contour stability is disposed at edges of the foam layer and the second portion is disposed in a central region of the foam layer, wherein the edges of the foam layer with the first portion that has the higher contour stability form respective contours on a visible surface of the decorative layer, and wherein the respective contours are reproduced from contours created in a computer aided design (CAD) system.

2. The method as claimed in claim 1, wherein the first portion of the foam layer has a greater hardness than the second portion of the foam layer.

3. The method as claimed in claim 2, wherein differing materials are used to produce the first and second portions of the foam layer.

4. The method as claimed in claim 1, wherein differing materials are used to produce the first and second portions of the foam layer.

5. The method as claimed in claim 1, wherein polyurethane is used to produce the first portion and to produce the second portion and wherein material characteristics of the polyurethane differ in the first and second portions.

6. The method as claimed in claim 1, wherein the first and second variants have a same overall thickness.

7. The method as claimed in claim 1, wherein a thickness of the decorative layer of the first variant is less than a thickness of the decorative layer of the second variant and a thickness of the foam layer of the first variant is greater than a thickness of the foam layer of the second variant.

8. The method as claimed in claim 1, wherein the spacer layer is used to produce a plurality of second variants of the multi-layer plastic component.

9. The method as claimed in claim 1, wherein the decorative layer of the first variant is a plastic skin.

10. The method as claimed in claim 1, wherein the decorative layer of the second variant has a lower, elastic layer facing the foam layer and an upper, synthetic or real leather layer bonded to the elastic layer.

11. The method as claimed in claim 1, wherein the decorative layer of the second variant is a single-ply layer made of synthetic or natural leather.

12. The method as claimed in claim 1, wherein the decorative layer of the second variant is adhesively bonded to the foam layer.

13. A method for selectively producing a first or a second variant of a multi-layer plastic component, wherein both the first and second variants have a substrate part, a decorative layer, and a foam layer disposed between the substrate part and the decorative layer, comprising the act of:
    forming the foam layer with a first portion that has a higher contour stability than a second portion of the foam layer, wherein the first portion that has the higher contour stability is disposed at edges of the foam layer and the second portion is disposed in a central region of the foam layer, wherein the edges of the foam layer with the first portion that has the higher contour stability form respective contours on a visible surface of the decorative layer, and wherein the respective contours are reproduced from contours created in a computer aided design (CAD) system.

* * * * *